United States Patent [19]

Guillet et al.

[11] 3,811,757

[45] May 21, 1974

[54] METHOD AND APPARATUS FOR CLAMPING A SPLIT COLLAR CLOSING DEVICE

[76] Inventors: Henri Guillet, 2 Bd Georges Creminceau; Robert Louvet, 26, rue dis Burgandis, both of Oyonnax, France

[22] Filed: Oct. 12, 1972

[21] Appl. No.: 297,002

[30] Foreign Application Priority Data

Oct. 18, 1971 France .......................... 7138157

[52] U.S. Cl. .................... 351/90, 351/154, 351/178

[51] Int. Cl. ............................................ G02b 21/24

[58] Field of Search .......... 350/320, 257, 251, 245, 350/178, 90; 351/90, 95, 97, 178, 141, 154

[56] References Cited

UNITED STATES PATENTS

| | | | |
|---|---|---|---|
| 1,341,503 | 5/1920 | Goldfaden | 351/90 |
| 2,112,644 | 3/1938 | Bausch | 351/90 |
| 2,332,261 | 10/1943 | Rohrbach | 351/178 |
| 1,556,371 | 10/1925 | Stiriss | 351/90 |
| 2,738,709 | 3/1956 | Mathews et al. | 351/90 |
| 1,784,151 | 12/1930 | Malcom | 351/154 |

FOREIGN PATENTS OR APPLICATIONS

| | | | |
|---|---|---|---|
| 319,032 | 6/1934 | Italy | 351/90 |

*Primary Examiner*—James W. Lawrence
*Assistant Examiner*—Harold A. Dixon
*Attorney, Agent, or Firm*—Alexander & Dowell

[57] ABSTRACT

The disclosure refers to an open ring device used for instance for mounting of eyeglasses or spectacles. The ring device has a slit which determines two ends. In each end there is recessed an annular groove, one half into the first end and another half into the second end. A washer having a circular projection fits into the annular groove to hold the first end of the device against its second end. The body of a screw passes through a central bore provided in the washer to co-act with a screw-threaded hole co-axial to the annular groove and located for one-half in said first end and for another half in said second end, while the head of the screw holds the washer confined into the annular groove.

The body of the screw can be screwed into a sleeve which is located in a hole which is not screw-threaded, said sleeve having a flanged portion abutting against the side of the ring ends opposite from the annular groove.

15 Claims, 12 Drawing Figures

METHOD AND APPARATUS FOR CLAMPING A SPLIT COLLAR CLOSING DEVICE

The present invention relates to an improved method and apparatus for clamping a split collar or ring closing device.

This invention aims especially at the mounting of eyeglasses or spectacles in particular non deformable mineral lenses in a rigid mounting circle this mounting being realized in a particularly simple and economic manner.

The invention comprises a method for permitting the clamping of a split collar, characterized in that there is developed on the two ends of this collar a force perpendicular to its general plane and which by means of a wedge effect is transformed partially into two components each applied on one end of the collar and directed in the direction of one another, and means for carrying out the method.

The open ring according to the invention is particularly notable in that each of its ends is hollowed out by a groove in which is disposed a member keeping these two ends applied against one another whilst a screw threaded hole the geometric axis of which is located in the plane of contact of the said ends receives a screw the head of which immobilises the aforesaid member in respect of the ring.

According to a preferred embodiment of the aforesaid arrangement the member is realized in the form of a washer having a bore with two diameters constituting a shoulder whilst the ends of the ring are hollowed so as to form a circular groove in which the washer engages. Once this latter is put in place its shoulder is supported against the face in question of the ring.

A spectacle mounting having two circles each provided with a tenon in two separate parts by a horizontal slit is essentially notable in that a bore, the axis of which is included in the plane of symmetry of the slit of the cross tenon, extends perpendicularly to the general direction one of the faces of the said tenon; and means are provided located in the vicinity of the aforesaid bore adapted to receive the action of members associated with the head of a screw the body of which crosses the bore to be screwed in the threaded hole of a sleeve carried by the corresponding branch thus causing the bringing together of the two parts of the tenon so as to clamp a glass in each circle.

The invention will be described with reference to the accompanying drawings.

Figures 1, 2, 3, 4, 5:
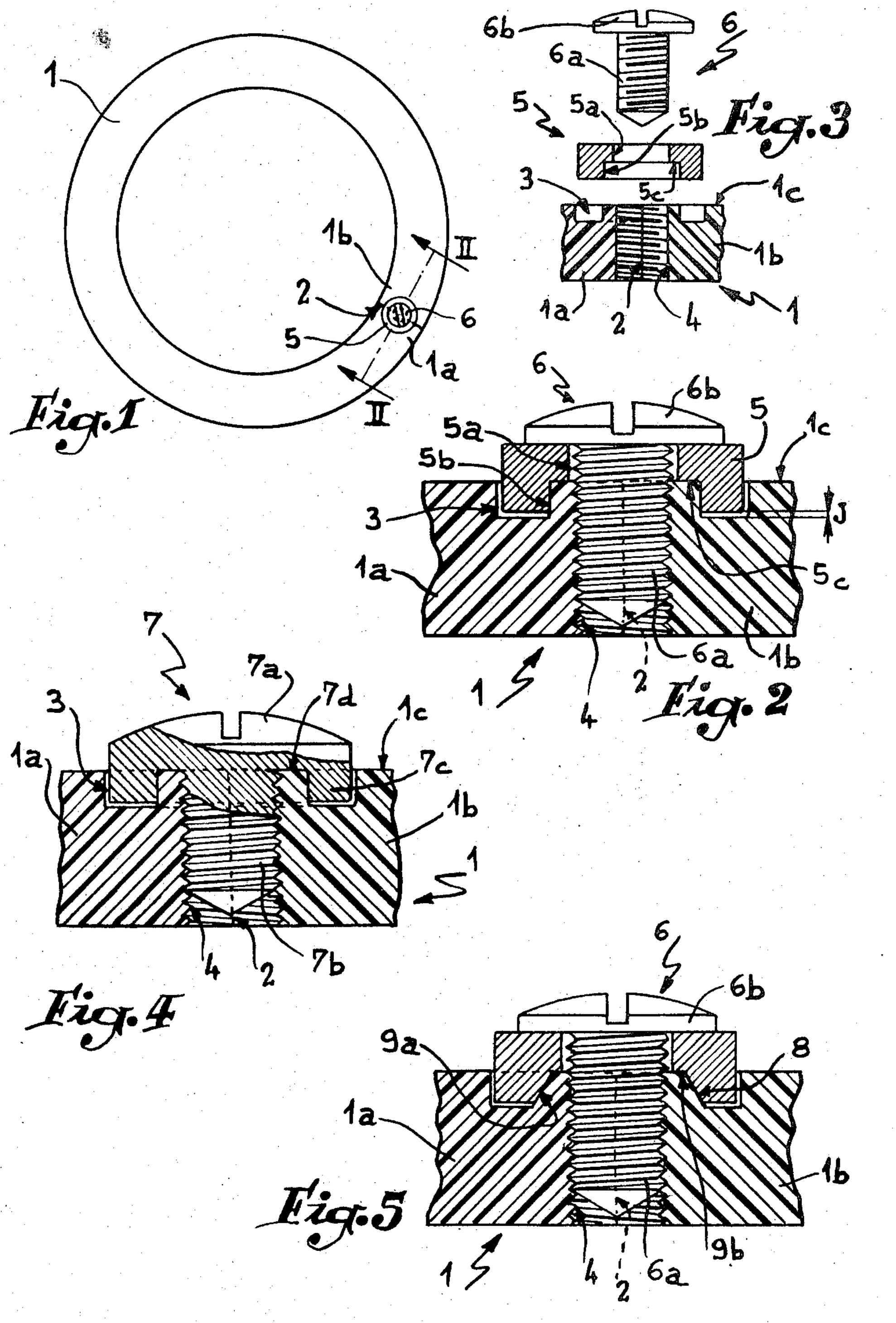
FIG. 1 is a view from above of an open ring comprising the application of a device according to the invention.
FIG. 2 is a view in section to a larger scale on the line II—II (FIG. 1)
FIG. 3 is a section to a smaller scale, and exploded, showing a device according to the invention.
FIGS. 4 and 5 are sections showing variations of FIG. 2.

In FIG. 1 is shown an open ring 1 having a radial split 2. This ring is made, for example, in a rigid plastic material but having a certain flexibility permitting when desired the moving away from one another of its two ends 1*a* and 1*b*. The ring 1 may, for example, be obtained from a single piece by injection moulding or by cutting its slit 2 by sawing.

The two ends 1*a* and 1*b* of the ring 1 are held one against the other by any suitable means; on its upper face 1*c* an annular groove 3 is hollowed out presenting in cross section, for example, a square shape in the centre plane of the split. In the geometrical axis of the groove 3 a hole 4 is provided which is then threaded (FIGS. 2 and 3).

The groove 3 and hole 4 form the constituent elements of the device according to the invention the latter to receive a washer 5 and a screw 6.

The washer 5 has a bore with two diameters 5*a*, 5*b* which define a horizontal shoulder 5*c* facing downwards. The diameter of the bore 5*a* is substantially equal to the inside diameter of the groove 3 whilst its height is less than that of the latter. The outer diameter of the washer 5 is made less than that corresponding to the groove 3.

The screw comprises a threaded body 6*a* with features corresponding to those of the threaded hole 4 and the diameter of this body 6*a* is less than that of the bore 5*a* of the washer 5. The screw 6 is provided with a wide head 6*b*.

The mounting is effected in the following manner:

The two ends 1*a* and 1*b* of the ring 1 being applied one against the other the washer 5 can be engaged in the groove 3 this washer holding the aforesaid ends 1*a* and 1*b* supported. By screwing the body 6*a* of the screw 6 in the threaded hole 4 the holding of the washer 5 in the groove 3 is effected and consequently the joining together of the two ends of the ring 1. It will be noted that the shoulder 5*c* of the washer 5 is supported on the upper face 1*c* of the ring 1 whilst a clearance J (FIG. 2) exists between the lower face of the washer 5 and the bottom of the groove 3. In this way a good clamping of the washer on the ring is ensured.

There is shown in FIG. 4 a variation of FIG. 2 in which the washer forms an integral part of the head 7*a* of a screw 7 the body 7*b* of which is screwed in the threaded hole 4. In other words the lower face of the head 7*a* of the screw 7 has an annular rim 7*c* the height of which is less than that of the groove 3 whilst its inner diameter is identical with that corresponding to this groove. The shoulder 5*c* of FIG. 2 is replaced by the lower face 7*d* of the screw 7. In the case of this variation the mounting is slightly more complex than the preceding one due to that fact that one is obliged to keep the ends 1*a* and 1*b* of the ring applied one against the other until the rim 7*c* has penetrated appreciably into the groove 3.

According to a second variation shown in FIG. 5 the groove 3 has in cross section the shape of a trapezium rectangle open upwards and it defines around the hole 4 a conical boss 8. The washer 5 of FIG. 1 is replaced by a washer 9 the lower bore 9*a* of which is conical and open downwards its concavity being similar to that of the boss 8. For the mounting according to this variation the screw 6 shown in the arrangement of FIG. 2 is used.

The mounting is effected in the following manner:

The ends 1*a* and 1*b* of the ring 1 are applied against one another then the washer 9 is put in place in the groove 3. Due to the concavity of the boss 8 and the bore 9*a* the washer 9 must be held in place in a positive manner in the groove 3 such that it does not receive the direct action of the head 8*b* of the screw 6.

It will be noted that in a preferred embodiment the shoulder 9*b* of the washer 9 is supported against the upper face 1*c* of the ring 1 so as to avoid any deformation of the threaded hole 4 when clamping the screw 6.

A device is thus realized permitting of closing in a simple and economical manner an open ring.

Figures 6, 7, 8, 9, 10, 11, 12:
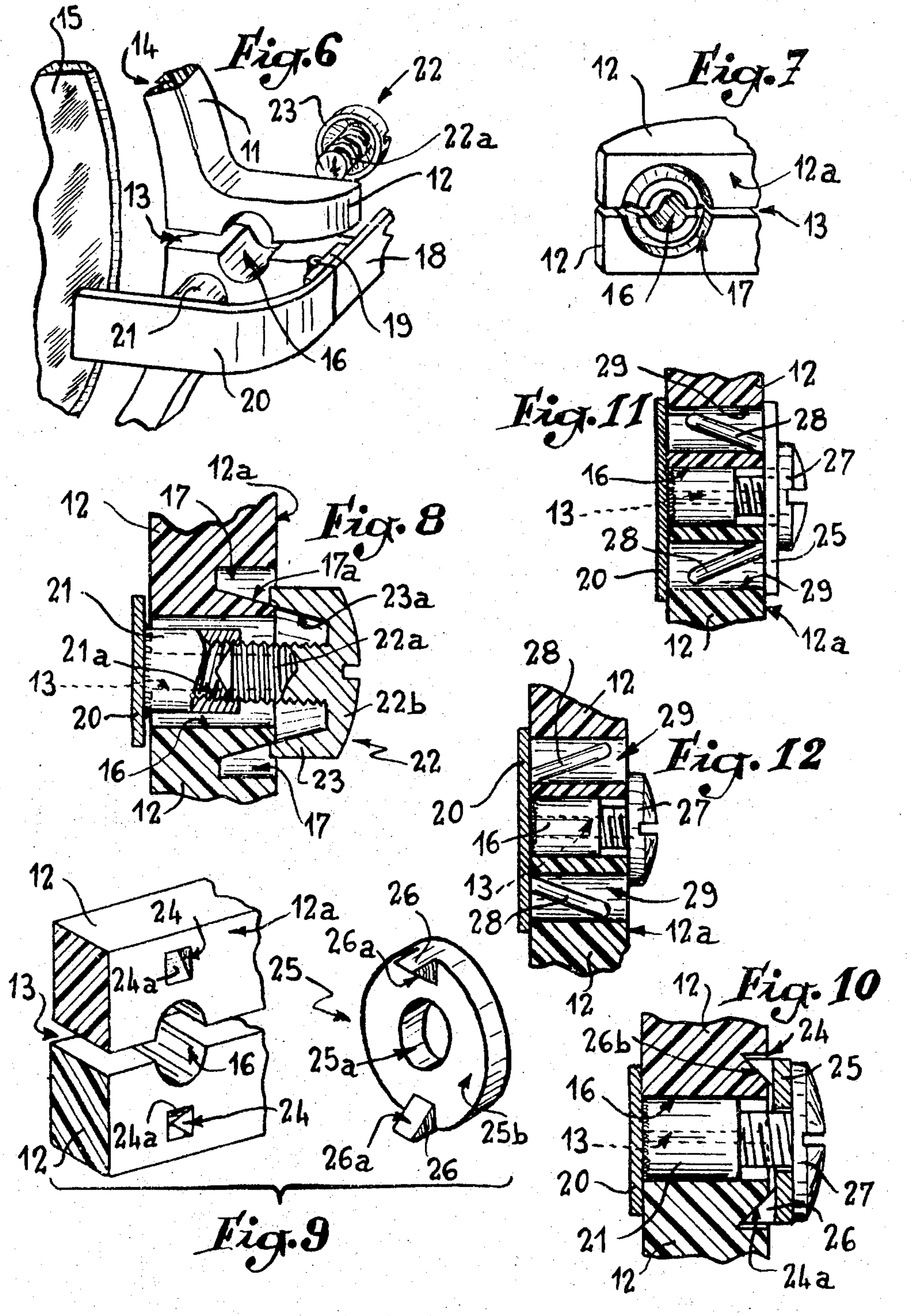
FIG. 6 is a partial exploded view of a spectacle mounting provided with a device according to the invention.
FIG. 7 is a detail view.
FIG. 8 is a section illustrating the operation of the device.
FIG. 9 shows an exploded view of a first variation of the invention.
FIG. 10 is a cross section illustrating a mounting realized by means of the variation of FIG. 9.
FIG. 11 is a section similar to that of FIG. 10 showing a second variation.
FIG. 12 is a section of a further variation.

There are shown partly in FIG. 6 the different elements of a spectacle mounting each circle 11 of which has a lateral extension or tenon 12 through which passes a slit 13 which permits the circle to be able to be deformed elastically in its own plane. The inner face of each circle 11 is hollowed out by a usual groove 14 adapted to receive a glass 15. The tenon 12 has a bore 16 the axis of which lying in the plane of symmetry of the slit 13 is directed perpendicularly to the general plane of the circle 11. This bore is made with the two parts of the tenon 12 brought close to one another, that is to say the two edges of the slit 13 not being far apart.

The inner face 12*a* (FIG. 10 of the tenon 12 is hollowed out concentrically to a bore 16 a circular groove 17 being made preferably at the same time as this bore.

The bore 16 and the circular groove 17 may be formed by moulding as well as the slit 13 subject to providing a shape suitable for the tool elements.

A member 18 is connected by means of a hinge 19 to a flat bar 20 having two perpendicular wings connected by a bowed part. The wing of the bar 20 which is directed perpendicularly to the member 18 is provided with a cylindrical sleeve 21 (FIG. 6) the outer diameter of which corresponds to that of the bore 16. The inner bore 21*a* (FIG. 8) of the sleeve 21 is threaded so as to be able to cooperate with the body 22*a* of a screw 22 the head 22*b* of which has a peripheral skirt 23, the inner face 23*a* of which is conical and open in the direction of the shank 22*a* of the screw 22. The concavity is identical with that of the inner face 17*a* of the groove 17.

The mounting is effected in the following manner:

The glass 15 is first of all placed in the greater part of the groove 14 of the circle 11. The sleeve 21 is then engaged in the bore 16 then the body 22*a* of the screw 22 is screwed in the bore 21*a* of the sleeve 21. After a predetermined number of turns the truncated face 23*a* of the skirt 23 comes into contact with the inner conical face 17*a* and the greater the longitudinal displacement of the screw 22 in respect of the sleeve 21 the greater the tendency to bring together the two parts of the tenon 12 due to the aforementioned action of the face 23*a* on the face 17*a*. A position in which the two parts of the tenon are brought sufficiently together for the bore 16 to be completely supported on the periphery of the sleeve 21 is then reached. Matters are arranged such that at this moment the glass 15 is suitably clamped in the groove 14.

According to a variation shown in FIG. 9 the inner face of the tenon 12 is hollowed out with two blind notches 24 disposed diametrically opposite in respect of the bore 16 of the tenon and directed on a geometrical axis perpendicular to the slit 13. The section of each of the notches 24 at the level of their opening on the face 12*a* of the tenon has, for example, a rectangular shape and the wall 24*a* of each of these notches located nearest the bore 16 is directed obliquely in respect of the aforesaid face 12*a* and diverges from this face in respect of the geometrical axis of the bore 16.

A flat washer 25 formed with a central hole 25*a* has on one of its faces 25*b* two claws 26 having a profile similar to that of each notch 24. The two opposite faces 26*a* of the claws 26 are divergent and the angle which they form with the face 25*b* is identical with that which the walls 24*a* form with respect to the face 12*a* of the tenon.

The mounting is effected in a manner similar to that of the device of FIGS. 6 to 8. Once the sleeve 21 is engaged in the bore 16 (FIG. 10) the washer 25 is disposed opposite the face 12*a* of the tenon 12 and its claws are placed at the start of each notch 24. A screw 27 passes through the washer 25 and is screwed into the sleeve 21. The driving of this screw in the direction of screwing causes the entry of the claws 26 into the notches 24 and consequently the application of each part of the tenon 12 onto the sleeve 21.

According to another variation shown in FIG. 11 the washer 25 has two oblique pins 28 diametrically opposite which cooperate with two parallel holes 29 and located on both sides of the bore 16. The action of the pins 28 on the generating line nearest the centre of the two holes 29 causes the clamping of the glass by bringing together the two parts of the tenon 12. It is obvious that the pins 28 could be carried by the bar 20 (FIG. 12).

What we claim is:

1. An open ring device having a radial slit which determines a first end and a second end, said first end having a first side and a second side, and said second end also having a first side and a second side, with an annular groove being provided for one half into the first side of said first end and for another half into the first side of said second end, said device further comprising:

a. a removable locking member adapted to fit into said annular groove to hold said first end against said second end; and b. and means to retain said removable locking member with respect to said first end and to said second end.

2. In an open ring device as claimed in claim 1, said annular groove having a vertical inner wall.

3. In an open ring device as claimed in claim 2, said locking member comprising a washer having a central bore, an outer face and an inner face, with said inner face having an annular projection to fit into said annular groove.

4. In an open ring device as claimed in claim 1, said annular groove having an inner wall; said locking member comprising a washer having a central bore, an outer face and an inner face, with said inner face having a circular projection to fit into said annular groove; and said retaining means comprising a screw having a body passing through said central bore of said washer to co-act with a screw-threaded hole co-axial with said annular groove and located for one half in said first end and for another half in said second end, and a head to hold said washer into said annular groove.

5. In an open ring device as claimed in claim 4, said head of said screw being integral with said washer.

6. In an open ring device as claimed in claim 4, said annular groove having a conical inner wall, and said circular projection of said washer being also conical.

7. In an open ring device as claimed in claim 4, said annular groove having a conical inner wall, and said circular projection of said washer being also conical, said head of said screw being integral with said washer.

8. In an open ring device as claimed in claim 1, said first end and said second end being recessed to provide a circular hole co-axial with said annular groove and formed for one half in said first end, and for one half in said second end;

and said retaining means embodying a first screw-threaded member and a second screw-threaded member screwed into each other within said hole, said first member being connected with said locking member, an said second member having a flanged portion abutting against the second side of said first end and against the second side of said second end.

9. In an open ring device as claimed in claim 8, said annular groove having a conical inner wall.

10. In an open ring device as claimed in claim 8, said first screw-threaded member of said retaining means being formed of a screw-threaded rod integral with said locking member, and said second screw-threaded member of the retaining means being comprised of a screw tapped cylindrical sleeve.

11. An open ring device having a radial slit which determines a first end and a second end, said first end having a first side and a second side, and said second end also having a first side and a second side, a first recess being provided into the first side of said first end, and a second recess into the first side of said second end, said device further comprising a removable locking member adapted to fit into said first and second recesses to hold said first end against said second end;

and means to retain said removable locking member with respect to said first end and said second end.

12. In an open ring device as claimed in claim 11, each of said first and second recesses having a tapered inner wall.

13. In an open ring device as claimed in claim 11, said first end and said second end being recessed to determine a circular hole located for one half in the first side of said first end and for another half in the first side of said second end;

and said retaining means embodying a first screw-threaded member and a second screw-threaded member screwed into each other within said hole, said first member being connected with said locking member, and said second member having a flanged portion abutting against the second side of said first end against the second side of said second end.

14. In an open ring device as claimed in claim 11; said locking member having two oblique rods to respectively cooperate with said first recess and with said second recess;

said first end and said second end being recessed to determine a circular hole located for one half in the first side of said first end and for another half in the first side of said second end;

and said retaining means embodying a first screw-threaded member and a second screw-threaded member screwed into each other within said hole, said first member being connected with said locking member, and said second member having a flanged portion abutting against the second side of said first end and against the second side of said second end.

15. In an open ring device as claimed in claim 11, said first end and said second end being recessed to determine a circular hole located for one half in the first side of said first end and for another half in the first side of said second end;

and said retaining means embodying a first screw-threaded member and a secons screw-threaded member screwed into each other within said hole, said first member being connected with said locking member, and said second member having a flanged portion abutting against the second side of said first end and against the second side of said second end, said flanged portion having two oblique rods to respectively cooperate with said first recess and with said second recess.

* * * * *

UNITED STATES PATENT OFFICE

CERTIFICATE OF CORRECTION

Patent No. 3,811,757 Dated May 21, 1974

Inventor(s) GUILLET and LOUVET

It is certified that error appears in the above-identified patent and that said Letters Patent are hereby corrected as shown below:

The heading of the patent item [30] should be corrected to add a second priority document:

November 10, 1971 - France - 71.41057

Signed and sealed this 24th day of September 1974.

(SEAL)
Attest:

McCOY M. GIBSON JR.
Attesting Officer

C. MARSHALL DANN
Commissioner of Patents

FORM PO-1050 (10-69)

USCOMM-DC 60376-P69
U.S. GOVERNMENT PRINTING OFFICE : 1969 O—366-334